Sept. 3, 1968      F. C. NAGELE      3,399,549

BACKLASH-FREE SPLINE JOINT

Filed Jan. 3, 1967

INVENTOR
FRANCIS CLARENCE NAGELE

BY *Strauch, Nolan, Neale, Nies & Kurz*
ATTORNEYS

United States Patent Office 3,399,549
Patented Sept. 3, 1968

3,399,549
BACKLASH-FREE SPLINE JOINT
Francis Clarence Nagele, Allegan, Mich., assignor to North American Rockwell Corporation, a corporation of Delaware
Filed Jan. 3, 1967, Ser. No. 606,749
10 Claims. (Cl. 64—23)

ABSTRACT OF THE DISCLOSURE

A longitudinally slidable spline joint connection between two telescoped torque transmitting shaft members wherein the outer member has a splined bore and the inner member projects within the bore and carries a pair of separately attached adjacent splined sleeve sections meshed with the bore splines, and wherein the splined sleeve sections are initially fixed in angularly displaced positions and on longitudinally spaced portions of the inner shaft member that are connected by a weakened intermediate portion and in the assembly the sleeve sections are relatively rotated into spline alignment as permitted by twisting of the intermediate shaft member portion which in the assembly acts as an energized torsion spring to oppositely urge the meshed splines into backlash-free engagement.

Background of invention

The invention relates to splined connections between torque transmitting shaft members in general. In the usual longitudinally slidable splined connections between shaft members undesirable radial clearances of varying degrees exist due to manufacturing tolerances and operational wear which eventually result in further wear, noise and high impact load on the splines when torque is initiated or reversed between the shaft members. This condition is known as "back-lash" and it is cumulative and causes premature failure at the spline connection.

Anti-backlash devices have been incorporated in gear transmissions which embody a split gear assembly and an adjustment mechanism to angularly offset two split gear halves in relation to each other upon assembly of the split gear with its mating gear to take-up circumferential play which may vary greatly because of manufacturing tolerances. Such a backlash reducing mechanism for gearing is, for example, disclosed in United States Letters Patent No. 3,020,775 to C. W. Musser.

Although backlash is especially pronounced in splined joints especially when worn due to continuous stop and start operations and direction reversals at intermittently high torque impact loads, such as may be encountered in vehicle shafts and steering columns, no practical anti-backlash arrangements for such are known. In splined shaft assemblies, due to the extreme space limitation, no additional adjusting means for eliminating backlash such as proposed for gears could be incorporated, and as a result in the past it has not been considered practical to provide an effective anti-backlash arrangement in drive shafts, collapsible steering columns and the like having sliding shaft spline joints.

The problem solved by the present invention was to provide a splined shaft connection for associated driven or driving torque transmitting members such as a universal joint shaft provided with a slip spline connection to compensate for varying shaft lengths such as may be employed in vehicle drive shafts, collapsible steering columns, or the like, within variable space limitations and free of backlash.

Summary of invention

The invention provides a backlash-free sliding shaft spline joint assembly that is particularly adaptable to changing length torque transmitting telescoping shaft assemblies such as drive shafts and collapsible steering shafts in automotive vehicles. One of the shaft members has a splined section mated with two splined sections on the other shaft member that are resiliently oppositely rotatively biased in the assembly to urge their splines against the splines of the first shaft member.

It is a major object of the invention to provide a novel sliding assembly for transmitting torque from one shaft member to another shaft member wherein the two shaft members are telescoped to house a sliding spline joint between them containing means to eliminate backlash between the shaft members upon initial application of torque to either in either direction.

Another object of the invention is the provision of a special spline connection between two telescoping shaft members to allow axial sliding and rotational torque transmission, the spline connection comprising a novel arrangement including a torsion member and a compound sleeve section on one shaft member wherein one sleeve section is initially angularly offset from the other sleeve section and wherein upon assembly of the shaft members the angularly offset splined sleeves are relatively rotated into spline alignment as permitted by the torsion member which will be loaded to constantly exert a torque bias on the respective sleeve sections by which backlash will be eliminated.

Another object of the invention is to provide a novel slidable splined shaft joint assembly wherein the outer shaft has a longitudinally splined bore and the inner shaft has a torsion spring section connecting spaced shaft portions on which are fixed initially angularly displaced sleeves having external splines adapted to be mated with the outer shaft bore splines, the torsion spring section being energized by relative angular displacement of the sleeves into splined alignment during assembly.

Preferred embodiments

Figure 1:
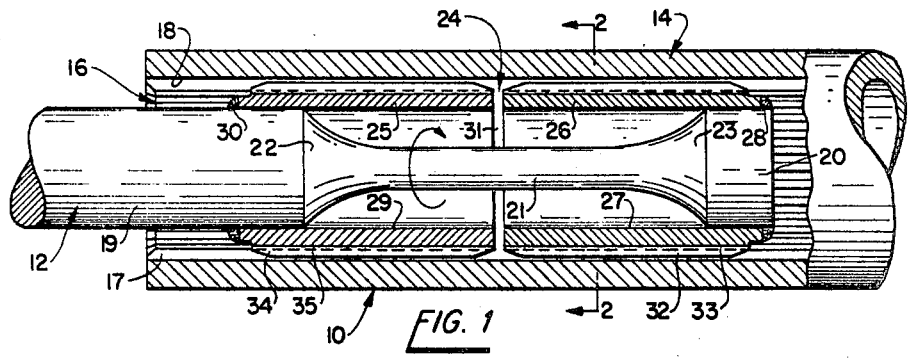
FIGURE 1 is a side elevation partly broken away and showing in longitudinal section the spline joint of a sliding shaft assembly according to a preferred embodiment of the invention.

FIGURE 1 shows a slip joint assembly 10 for a drive shaft, steering column or the like. Slip joint 10 comprises an inner shaft member 12 and a coaxial hollow outer shaft member 14 telescopically arranged. For transmitting torque from one shaft member to the other and to permit axial sliding movement therebetween the two shaft members, they are connected by a longitudinal spline connection 16. Shaft member 14 is torsionally rigid as compared to shaft member 12.

Figure 2:
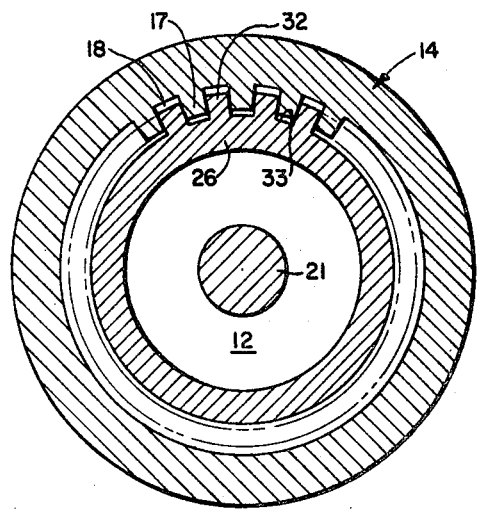
FIGURE 2 is an enlarged section through FIGURE 1 substantially along line 2—2.

Shaft member 14 has at one end a cylindrical bore formed with longitudinal splines 17 having longitudinal spaces 18 therebetween as shown in FIGURE 2.

Inner shaft member 12, where it extends within the bore of outer shaft member 14, comprises spaced cylindrical body and extreme end portions 19 and 20 respectively connected by a reduced diameter portion 21 are connected to the main and end shaft portions by similar transition sections 22 and 23 of changing diameter.

As will appear shaft portion 21 also functions as a torsion spring in the assembly.

A compound sleeve assembly 24 is secured upon inner shaft member 12. Sleeve assembly 24 comprises identical coaxial sleeve sections 25 and 26. The inner sleeve section 26 has a cylindrical bore 27 fitting over inner shaft end portion 20 and the inner end of sleeve section 26 is integrally fixed upon the shaft end portion 20 as by an annular weld 28. Similarly outer sleeve section 25 has a cylindrical bore 29 fitting over the shaft body 19, and the outer end of sleeve section 25 is integrally fixed upon the shaft body as by annular weld 30.

Preferably the sleeve sections 25 and 26 are so arranged that they project toward each other equidistantly over the torsion rod portion 21 of shaft member 12 and terminate adjacent each other with a narrow end spacing gap indicated at 31.

Inner sleeve section 26 is formed with a series of external longitudinally extending splines 32 with longitudinal spaces 33 between them. Similarly outer sleeve 25 is formed with a series of external longitudinal splines 34 with longitudinal spaces 35 between. The number of splines on each sleeve section is the same and corresponds to the number of splines 17 in the bore of shaft member 14. The sleeve splines 32 and 34 are of the same size and are made to fit with conventional tolerance in mating relation within the spline spaces 18, and the spline spaces 33 and 35 on the sleeves are of the same size and fit with conventional tolerance in mating relation with splines 17 of the hollow shaft portion.

Preferably all of the splines and spaces above described are straight sided radially of their shaft portions and lie in longitudinal planes intersecting the common shaft axis, but other conventional spline forms may be used.

Figure 3:
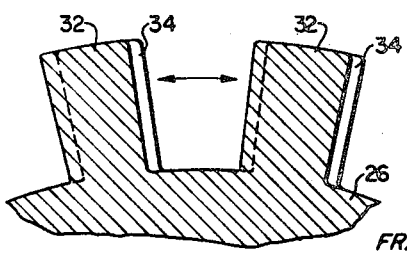
FIGURE 3 is an enlarged fragmentary end view illustrating the angularly offset position of the splined sleeves relative to each other in the assembly.

Sleeve sections 25 and 26 are welded in permanent relation to shaft member 12 prior to insertion into shaft member 14. As shown in FIGURE 3, the splines of the respective sleeve sections are disposed in a slight angularly offset relation, so that apart from the assembly corresponding splines on them will be correspondingly slightly circumferentially displaced out of longitudinal alignment. The amount of such displacement need correspond only to the average maximum clearance between the mated spline sides encountered in normal production machining, although to compensate for larger tolerances and allow for wear the displacement may be made larger. In any event the nonalignment of the splines on the respective sleeve sections will be only a small displacement.

In assembly after sleeve sections 25 and 26 have been fixed in angularly displaced relation on shaft member 12, the end of shaft member 12 is thrust into the hollow shaft member 14 with splines 17 and 32 meshing in longitudinal sliding relation. The non-aligned outer sleeve section splines 34 will not now enter the bore. In the invention shaft member 14 is now held against rotation about its axis and a suitable turning force is exerted on shaft member 12 to rotate it about its axis. The splined engagement of sleeve section 26 with shaft member 14 will hold sleeve 26 against any rotation except to take up the manufacturing tolerance, and then continued torque applied to shaft member 12 at body 19 will rotate body 19 and attached sleeve section 25 as a unit, as permitted by the resiliency of the now twisting torsion rod section 21, until splines 34 line up with spaces 18 and shaft member 12 can be pushed further into the bore of shaft member 14 to assume to position shown in FIGURE 1.

Now shaft members 12 and 14 are released, and upon release of the torque the shaft section 21 which now functions as an energized torsion spring tends to regain its untwisted condition and thereby oppositely rotates sleeve sections 25 and 26 about the shaft axis, whereby the opposite faces of the splines in the respective sleeve sections are urged tightly against opposite faces of splines 17 and there is no backlash in the assembly. Thus upon initiation of torque transmitted in either direction from either shaft member the other shaft member will immediately start to turn without any delay due to backlash.

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description, and all changes which come within the meaning and range of equivalency of the claims are therefore intended to be embraced therein.

What is claimed and desired to be secured by Letters Patent is:

1. In a backlash-free joint assembly between two coaxial shaft members that are longitudinally slidably interconnected by meshed splines, the improvement comprising means providing two longitudinally spaced splined sections on one of said members with the splines of both sections meshed with splines on the other member and means resiliently biasing said sections in opposite directions about the axis of said assembly.

2. In the joint assembly defined in claim 1, said shaft members comprising respectively an outer hollow shaft member having a splined bore and an inner shaft member projecting within said bore, said splined sections being separately mounted on longitudinally spaced portions of said inner shaft member.

3. In the joint assembly defined in claim 2, said resilient biasing means being integral with said inner shaft member and located axially between said spaced portions of the inner shaft member.

4. In the joint assembly defined in claim 1, said splines having lontgitudinally straight sides in sliding engagement in the assembly.

5. In the joint assembly defined in claim 1, said shaft members comprising respectively an outer shaft member having a splined bore and an inner shaft member having two longitudinally spaced portions interconnected by a resilient portion, and said splined sections being separate sleeves independently fixed on said spaced inner shaft portions with external splines meshed with the splines of said bore.

6. In the joint assembly defined in claim 5, said resilient portion of the inner shaft member being a reduced diameter shaft portion serving as a torsion spring in the assembly.

7. In the joint assembly defined in claim 1, said shaft members comprising respectively an outer shaft member having an internal bore formed with longitudinal splines and an inner shaft member projecting within the bore end having longitudinally spaced shaft portions interconnected by a weakened shaft portion, and said splined sections being separate sleeves independently fixed to said inner shaft portions and having external splines meshed with the bore splines.

8. In the joint assembly defined in claim 7, said sleeves being fixed to said inner shaft portions at opposite ends and extending toward each other in surrounding relation to said weakened shaft portion within said bore.

9. In the joint assembly defined in claim 7, said sleeve sections being oppositely biased about the axis of said assembly and said weakened shaft portion serving as a torsion spring between said sections.

10. In the joint assembly defined in claim 7, said sleeves being fixed to the respective inner shaft portions in predetermined angularly displaced relation prior to assembly and being forced into substantially spline alignment during assembly as permitted by torsional flexing in the weakened shaft portion, which later thereby in energized to serve as a torsion spring in the assembly.

References Cited

UNITED STATES PATENTS

| | | | |
|---|---|---|---|
| 2,822,677 | 2/1958 | Reynolds | 64—27 X |
| 3,020,775 | 2/1962 | Musser | 64—27 X |
| 3,142,973 | 8/1964 | Evans et al. | 64—27 |

FOREIGN PATENTS

| | | |
|---|---|---|
| 691,281 | 5/1953 | Great Britain. |

HALL C. COE, *Primary Examiner.*